Feb. 25, 1947.  F. MEYER  2,416,489
LOAD TRANSFER APPARATUS FOR LOOSE MATERIAL
Filed Dec. 5, 1944
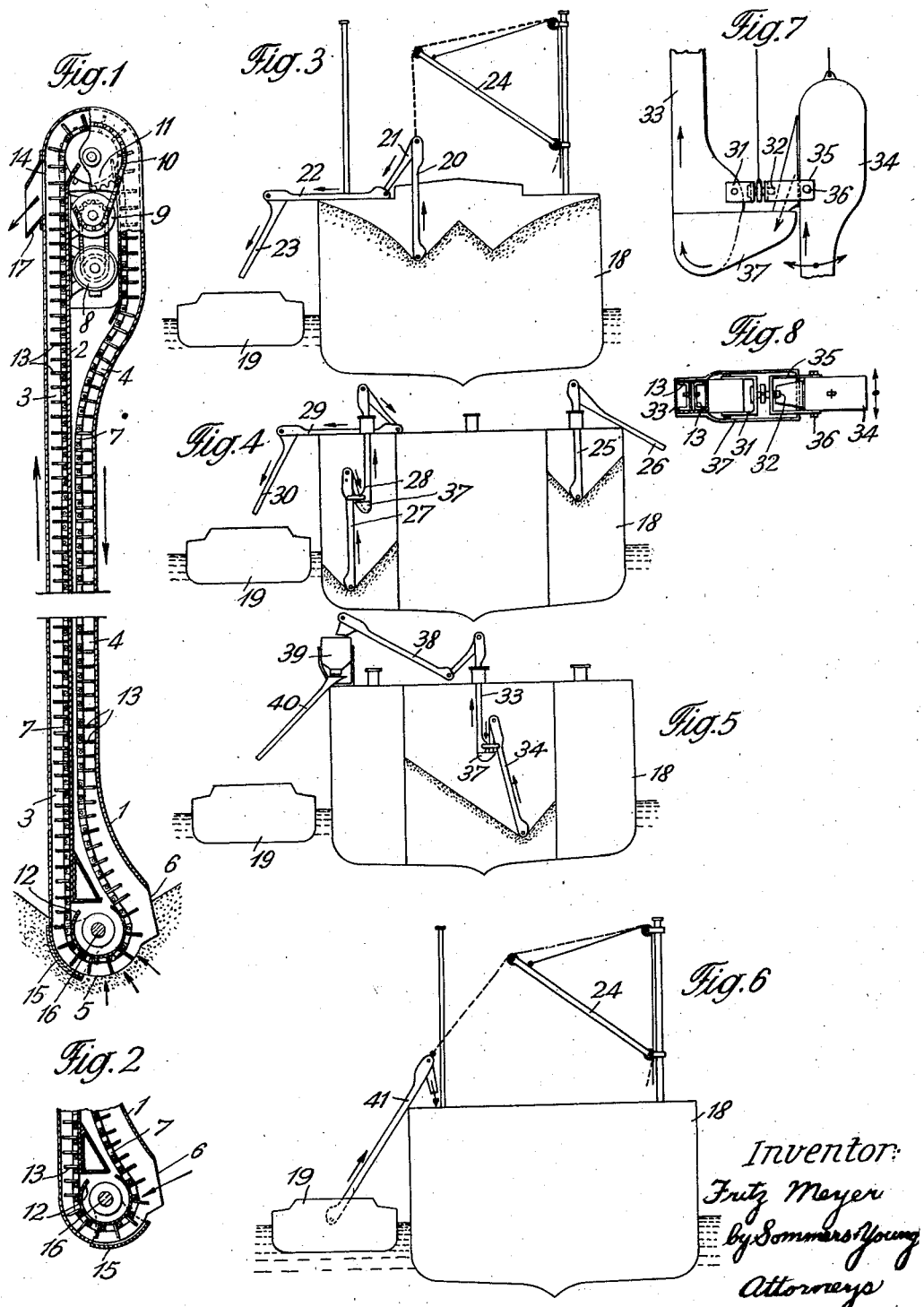
Inventor:
Fritz Meyer
by Sommers & Young
Attorneys Patented Feb. 25, 1947

2,416,489

UNITED STATES PATENT OFFICE 2,416,489

LOAD TRANSFER APPARATUS FOR LOOSE MATERIAL

Fritz Meyer, Uzwil, Switzerland, assignor to Gebrüder Bühler, Uzwil, Switzerland Application December 5, 1944, Serial No. 566,697
In Switzerland April 14, 1943

2 Claims. (Cl. 198—207)

This invention relates to load transfer apparatus for loose material, and more particularly to apparatus for loading and unloading of ships.

For loading or unloading ships, particularly for handling grains or other loose, flowable material, there are used pneumatic conveyers, or chain conveyers which transport the material in a continuous stream, or also combined apparatus comprising pneumatic and chain conveyers. Use is made also of grab cranes which intermittently discharge the load. Such apparatuses, however, have the disadvantage that they are very heavy and ponderous; they weigh hundreds of tons and require for their operation large stationary or floating plants, which are to be found only at important sea ports having the necessary harbour equipment.

It is an object of the invention to provide a load transfer apparatus, particularly for loading or unloading ships, by means of which loose flowable material can be transferred to and from ships also in small harbours and independently of any special harbour equipment.

According to the invention, the load transfer apparatus comprises a series of single conveyer elements adapted to be used one at the time or to be successively placed in series one after the other in any desired number and which elements are each formed by an independent chain conveyer having an endless conveyer chain movable in a closed conveyer casing and carrying its own driving motor. These conveyer elements preferably are of such a size that they can be handled without requiring any hoisting apparatus and that the hauling output per hour, or the weight of the conveyed material per hour is equal to at least twenty times the weight of one of the conveyer elements.

In a practical embodiment of an apparatus according to the invention, the single conveyer element has a weight of about 500 kilograms at a hauling output of 50 tons per hour. This output corresponds to hundred times the own weight of a single conveyer element. The elements preferably are constructed as chain conveyers of the so called "Redler" type, in which an endless conveyer chain moves the loose material in a continuous stream along a closed conveyer casing. Such elements can be disposed to convey the loose material in vertical, inclined or horizontal direction.

Owing to the relatively small weight of the single elements, a certain number of them can be carried along by the ships themselves, so that for loading, transferring or unloading the ships, they are not bound to important harbour equipment and can also charge or discharge the load in smaller ports. For carrying the elements from one working place to another, no transporting means are required, but a few men can carry the elements which may be lowered by hand into the ship's hatch, where they automatically grab with their lower end the material to be unloaded. It is naturally possible to suspend the elements to a ship's crane or to the jib of a ship's mast, when such hoisting apparatus is available. For the same output, such conveyer elements require up to twenty times less power than a pneumatic conveyer and their initial cost is considerably smaller.

The conveyer elements can also be used for other purposes than loading or unloading ships, for instance for loading or unloading railway cars, or for transferring grains in ware houses.

The invention will be more fully disclosed in the following specification, reference being had to the accompanying drawing in which, Fig. 1 is a longitudinal section through a conveyer element according to the invention;

Fig. 2 shows the charging end of the conveyer element in section;

Figs. 3, 4 and 5 show diagrammatically several combinations of conveyer elements used in unloading ships;

Fig. 6 diagrammatically represents the use of a conveyer element for loading a ship;

Fig. 7 diagrammatically represents a modification of the manner of connecting two successive conveyer elements;

Fig. 8 is a plan view of the arrangement shown in Fig. 7, partly drawn in section.

The chain conveyer represented in Fig. 1 forms an independent conveyer unit and comprises a closed conveyer casing 1 separated by a partition wall 2 into a conveying trough section 3 and a return section 4. The lower or charging end of the casing 1 is provided with an inlet opening formed in two portions 5 and 6 for the loose material to be conveyed. At the other end of the casing the two sections 3 and 4 form a loop within which the drive for the conveyer chain 7 is mounted. This drive includes a motor 8 connected to a reduction gear 9 from which movement is transmitted by a chain 10 to a driving wheel 11 of the conveyer chain 7. At the charging end, the conveyer chain passes over a circular guide 12. The chain 7 is provided with the usual U-shaped conveyer arms 13. The conveying side of the chain 7 moves the material to be lifted from the inlet end of the casing 1 in a continuous stream through the casing section 3 to the outlet end of the casing which carries the chain drive. At the outlet end the material discharges through the opening 14. The represented conveyer element can operate in any position, vertical, horizontal, or inclined.

At the inlet end of the casing a movable gate 15 is pivotally mounted on a pin 16. This gate can be brought into the two positions shown in Figs. 1 and 2, respectively. When the conveyer element is lowered for example into the hold of a ship to rest directly on the material to be hauled, then the gate 15 is brought into the position shown in Fig. 1. The grains or other loose materials enter through the openings 5 and 6 into the casing and are automatically grabbed by the chain arms 13 and moved along the casing section 3 to the outlet 14.

When two elements such as shown in Fig. 1 are linked together, then the gate 15 of the second element is brought to the position shown in Fig. 2, where it closes the opening 5. The outlet nozzle 17 of the lower element enters into the opening 6 of the upper element, and the material discharges from the lower element into the charging end of the upper element and is moved further by the conveyer chain of this upper element.

The described conveyer element has such dimensions that it can be carried by a few men, and that its greatest width measured at right angles to the conveying direction does not exceed 1 meter. According to the distance through which the material has to be conveyed, a single element or a plurality of elements mounted in series can be employed.

In the example of Fig. 3 loose material is unloaded from a ship 18 to a lighter or barge 19. A vertically disposed conveyer element 20, such as that described with reference to Fig. 1, is lowered into the hold of a ship. The discharge end of this element 20 is connected by a pipe or chute 21 to a further similar conveyer element 22 disposed horizontally. This pipe or chute 21 enters into the opening 6 (Fig. 1) of the horizontal conveyer 22, which has the gate 15 disposed in the position shown in Fig. 2. From the discharge end of the conveyer element 22 a further pipe or chute 23 discharges the loose material into the lighter 19. These conveyer elements can be brought by hand into their position of operation; the use of cranes or other hoisting apparatus is not required, owing to the reduced size and weight of the elements. Naturally, if desired, the element 20 can be suspended from the jib 24 of the mast of the ship, in order to maintain it in vertical position, or to use the ship's crane, if available, for lowering the element into the hold.

As shown in Fig. 4 on the right side, a single conveyer element 25 may be sufficient for hauling loose material from the hold of a ship into a chute 26. When the level of the material has lowered so far that a single element cannot raise the material any longer through the hatch, then two elements can be coupled as shown on the left side of Fig. 4. The element 27 grabs the material in the hold of the ship and delivers it to the element 28 which further raises the material through the hatch and delivers it to the horizontal conveyer 29 from which it is discharged through the chute 30 to the lighter 19.

As shown in the modification of Figs. 7 and 8 a bracket 31 is secured to the inlet end of the conveyer casing of one element 33, and carries a pin 32. The discharge end of the other element 34 is hingedly connected to a bracket 35 by pins 36, while the bracket is rotatably engaged over the pin 32. The conveyer element 34 thus can effect limited movements of rotation in two planes at right angles to each other about the axes of the pins 32 and 36, so as to enable the element 34 lowered into the hold of a ship to be angularly adjusted relatively to the element 33, as shown in Fig. 5, the lower element being accordingly capable of grabbing the material along the sides of the hold. In this case the lower end of the upper element 33 can receive a removable feeding bin 37 into which discharges the lower element and which permits the conveyer chain of the upper element to grab the discharged material. In Fig. 5 a third element 38 conveys the material to be unloaded to a weighing apparatus 39 placed on the deck of the ship, wherefrom the weighed material falls through the pipe 40 into the barge 19.

The articulated connection between two successive elements can also be otherwise than shown in Figs. 7 and 8. In most cases however sufficient relative mobility between successive elements will be obtained when the discharge nozzle 17 (Fig. 1) of the lower element is simply engaged into the inlet opening 6 of the upper element.

In the example according to Fig. 6 loose flowable material is loaded from a transport barge 19 into a ship. For this purpose a single conveyer element 41 according to the invention is used, which can be suspended on the jib 24 of the ship's mast, while the inlet end of the conveyer element is lowered into the hold of the barge and the outlet end reaches over the deck of the ship. The material in the barge is grabbed automatically and raised to the discharge end of the element wherefrom it falls into the hold of the ship. A further horizontally disposed conveyer element could also be connected to the outlet end of the element 41 in order to convey the raised material to more distant hatches of the ship.

While I have shown and described a preferred example only of conveyer elements according to the invention it is to be understood that various changes and modifications can be made, for instance in the disposition of the driving means for the conveyer chain or in the connection between successive elements, without departing from the spirit of the invention or from the scope of the appended claims.

I claim:

1. In conveyor means for loose material, a casing having an opening at its bottom end for receiving loose material directly from a mass of material, an endless conveyor chain moving in the casing, conveyor drive means mounted on the casing, the casing having an outlet removed from the receiving opening, a gate movably mounted on the casing at its bottom end to occupy a position at one side of the receiving opening when the bottom end of the casing is engaged in the material to be conveyed, or partly covering the receiving opening and then serving as receptacle for initially holding material introduced through the remainder of the opening from the outlet of a similar conveyor casing.

2. In conveyer means for loose material, a casing having an opening at its bottom end for receiving loose material directly from a mass of material, an endless conveyor chain having a plurality of spaced transverse conveyor arms moving in the casing to convey material therethrough, conveyor drive means mounted on the casing, said casing having an outlet nozzle removed from the receiving opening, a gate movably mounted on the casing at its bottom end to occupy a position at one side of the receiving opening when the bottom end of the casing is engaged in the material to be conveyed, or partly covering said receiving opening whereby to permit engagement of an outlet nozzle of a second similar conveyor casing in the remainder of the opening, said gate then serving as receptacle for initially holding material fed by said outlet nozzle.

FRITZ MEYER.

REFERENCES CITED

The following references are of record in the file of this patent:

UNITED STATES PATENTS

| Number | Name | Date |
|---|---|---|
| 38,004 | Krausch | Mar. 24, 1863 |
| 881,429 | De Mayo | Mar. 10, 1908 |
| 2,311,084 | Redler | Feb. 16, 1943 |

FOREIGN PATENTS

| Number | Country | Date |
|---|---|---|
| 76,088 | Austrian | Apr. 10, 1919 |
| 122,918 | German | Aug. 9, 1901 |